United States Patent
Le Buhan et al.

(10) Patent No.: US 8,028,332 B2
(45) Date of Patent: Sep. 27, 2011

(54) VERIFICATION METHOD OF A TARGET DEVICE CONNECTED TO A MASTER DEVICE

(75) Inventors: Corinne Le Buhan, Les Paccots (CH); Yishan Zhao, Antony (FR)

(73) Assignee: Nagravision S.A., Cheseaux-sur-Lausanne (CH)

( * ) Notice: Subject to any disclaimer, the term of this patent is extended or adjusted under 35 U.S.C. 154(b) by 1274 days.

(21) Appl. No.: 11/373,214

(22) Filed: Mar. 13, 2006

(65) Prior Publication Data

US 2007/0061875 A1 Mar. 15, 2007

(30) Foreign Application Priority Data

Sep. 14, 2005 (EP) ..................................... 05108446

(51) Int. Cl.
*H04L 29/08* (2006.01)
(52) U.S. Cl. ............................... 726/10; 726/27; 726/30
(58) Field of Classification Search .................. 380/201, 380/203, 205; 725/139; 726/10
See application file for complete search history.

(56) References Cited

U.S. PATENT DOCUMENTS

| | | | |
|---|---|---|---|
| 6,256,741 B1 * | 7/2001 | Stubblebine | 726/10 |
| 6,360,320 B1 * | 3/2002 | Ishiguro et al. | 713/164 |
| 6,438,690 B1 * | 8/2002 | Patel et al. | 713/156 |
| 6,636,975 B1 * | 10/2003 | Khidekel et al. | 726/10 |
| 7,039,802 B1 * | 5/2006 | Eskicioglu et al. | 713/156 |
| 7,225,164 B1 * | 5/2007 | Candelore et al. | 705/57 |
| 7,310,732 B2 * | 12/2007 | Matsuyama et al. | 713/176 |
| 7,380,133 B2 * | 5/2008 | Jaquier | 713/193 |
| 7,424,613 B2 * | 9/2008 | Han et al. | 713/168 |
| 2001/0020241 A1 * | 9/2001 | Kawamoto et al. | 707/202 |
| 2004/0125959 A1 * | 7/2004 | Beuque et al. | 380/279 |
| 2005/0075986 A1 * | 4/2005 | You et al. | 705/71 |
| 2006/0020784 A1 * | 1/2006 | Jonker et al. | 713/157 |

FOREIGN PATENT DOCUMENTS

WO  WO 03/107589 A1 * 12/2003
WO  WO 2004112004 A2 * 12/2004

* cited by examiner

*Primary Examiner* — Taghi Arani
*Assistant Examiner* — Justin T Darrow
(74) *Attorney, Agent, or Firm* — Harness, Dickey & Pierce, P.L.C.

(57) ABSTRACT

Example embodiments are directed to a revocation lists management method, namely a verification method of a target device connected to a master device, the master device having means to receive a content transmitted by a broadcast centre via a data stream, the master device and the target device authenticating themselves by the exchange of a certificate having at least one certificate identifier. The method includes transmitting by broadcast a target device verification table containing a certificate identifier list, storing certificate identifier list in the master device, extracting a verification data associated to the content, the verification data including the activation or the deactivation of the verification of the target device. If the verification data includes the activation of the verification, the method includes verifying the certificate of the target device by the master device using at least one list stored to authorize or prohibit the exchanges of data with the target device.

19 Claims, 1 Drawing Sheet

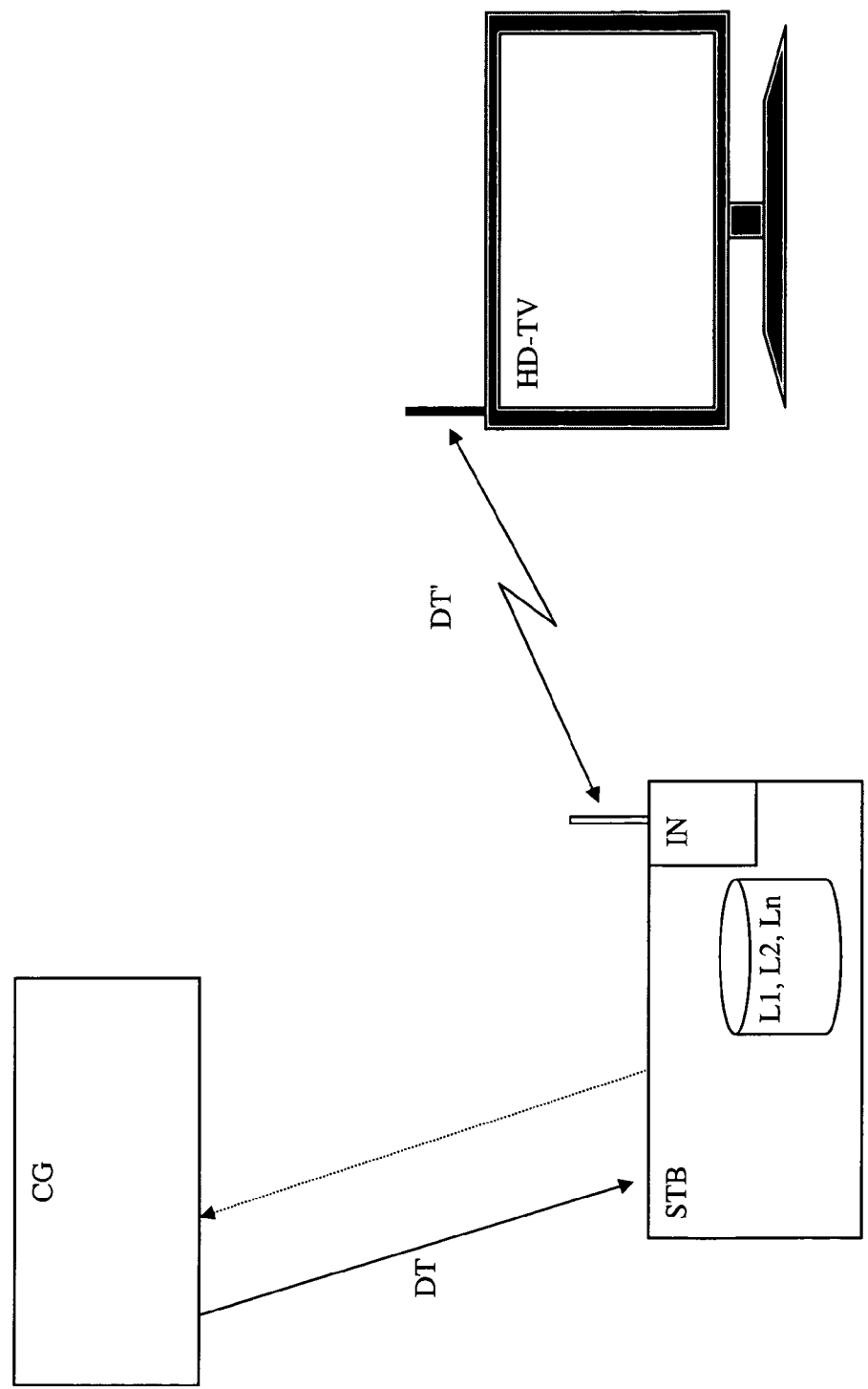

VERIFICATION METHOD OF A TARGET DEVICE CONNECTED TO A MASTER DEVICE

INTRODUCTION

The present invention refers to the domain of digital data protection, in particular broadcasted data of the audio/video type.

STATE OF THE ART

The exchange of data such as a video stream between digital processing devices requires the implementation of technologies that prevent the piracy of this data when it is accessed and when it is transferred on open networks, such as home networks. Therefore, with the arrival of digital televisions, it is now possible to find DVD readers that have a digital output towards these televisions. It is obvious that the optimal anti-copy protection on the DVD itself is senseless if the simple use if the information output from the reader is accessible.

For this reason, solutions such as DTCP, HDCP, Smart-Right, or SVP have been specified for the protection of data transmitted within a domestic network by adding an encryption of the output data for this type of equipment. This encryption is carried out by means of enciphering algorithms called symmetrical that require confidential mechanisms for the establishment of the corresponding keys that must be known to the transmitter apparatus as well as to the receiver apparatus of the data, all of which are renewed regularly to maintain their confidentiality. According to one preferred approach, each device includes in its communication means, a certificate containing a private key and a public key allowing the establishment of a secure authenticated channel (SAC—secure authenticated canal). These certificates contain an identification number and generally correspond to the X.509 standards.

Likewise, the certificate is used for a mutual authentication or authentication of the receiver according to the known verification mechanisms.

Past experience has shown how an originally well conceived system can rapidly become obsolete if it is not capable of adapting to external attacks. All the security of the solutions on the basis of the exchange of certificates, also known under the general denomination of PKI (Public Key Infrastructure), rely either on the regular renewal of the certificates, which is difficult to implement in the case of large public apparatuses, or on the revocation of the certificates whose security has been compromised, for example in the case of an apparatus whose secrets (in particular the private key) have been extracted by piracy and reproduced on a large scale (cloning of the apparatus, for example in the form of counterfeit software).

For this reason, there is a tendency is to add to the DVD a revocation list of devices whose certificates no longer satisfy security standards. Prior to the diffusion of said DVD, a verification is carried out in order to verify if the reader is authorized to access the content and if the device linked to the reader is prohibited from receiving this content. This verification is carried out thanks to a list of the revoked certificates (negative list, called a black list). In the world of television broadcasting, a similar principle can be applied namely to the diffusion of a revocation list and a verification process of the receiver and of the devices connected to this receiver when the latter requires the reception of data received by the receiver. However, this approach raises different technical and commercial constraints according to differences, in terms of technical constraints between television broadcast applications and the distribution of content on pre-packed supports such as the DVD.

BRIEF DESCRIPTION OF THE INVENTION

The aim of this invention is to propose different distribution and management methods of the revocation lists associated to anti-copy protection standards in order to facilitate the processing of said lists in a television broadcast environment by guaranteeing security against the pirating of the receiver equipment and the equipment connected to this television broadcast receiver at the core of a home network.

This aim is achieved by a verification method of a target device connected to a master device, the latter having means to receive a content transmitted by a diffusion centre via a data stream, the master device and the target device authenticating themselves by means of the exchange of a certificate comprising at least one certificate identifier, this method comprising the following steps:
a. transmission by broadcast of at least one target device verification table containing a certificate identifier list,
b. storage of this list in the master device,
c. extraction of a verification indication associated to the content, this indication comprising the activation or the deactivation of the verification of the target device,
d. if the verification indication includes the activation of the verification, verification of the certificate of the target device by the master device, use of at least one stored list to authorize or prohibit the exchange of data with said target device.

Therefore, the diffusion centre can decide to activate or deactivate the verification of the target device according to the content broadcast. Unlike the transmission of the lists in the case of a DVD, the verification list is not directly associated to the content, since on one hand it needs to transmit at regular intervals on all the channels diffusing a content requiring protection against piracy, which represents a commercially unacceptable use of bandwidth on the television broadcast networks such as terrestrial networks or satellites, and on the other hand the receiver needs to reconstitute the list each time there is a programme change on a channel or a change of channel in the case of channel zapping, which could last a long time before accessing the first images, thus notably penalizing the television viewers.

Furthermore, according to one embodiment of the invention, the verification list can take two forms: positive list or negative list.

According to a first embodiment, the negative list contains the invalidated certificate identifiers corresponding to equipment that is no longer authorized to receive the content. This list is managed by the supplier of the protection system used and transmitted to the content suppliers (the studios holding the copyrights, for example) who are the beneficiaries of said protection system in a specific form, often called SRM (System Renewability Message).

The negative list is usually used in applications such as DVD distribution for which it is not possible to transmit individually the data to a large public reader. Similarly, in the case of free television broadcast applications, this negative list must be transmitted to all receivers since there is no mechanism available to distinguish among them. However, the negative list calls for a good knowledge of piracy and in the future, this list will increase as piracy develops, until eventually it will reach such proportions that the size of the list renders it unmanageable in television broadcasting. This problem is even more critical in the pay television broadcast applications in which the reception of the contents is subject to previous payment, namely in the form of subscription or request.

For this reason, more specifically for these applications, a second embodiment of the invention proposes to transmit and manage individually a positive list of apparatuses authorized to work with the receiver rather than a negative global list of the receiver area. This embodiment uses a secure communication channel established with each receiver individually in parallel with the global television broadcast of the data to all the receivers.

According to this second embodiment, the positive list contains the valid certificate identifiers for a given home network, that is to say authenticating the apparatuses that are authorized to receive the content after a connection with the master device within a home network. Therefore, the positive list is restricted in size, a home network rarely consisting of more than approximately ten pieces of equipment.

The embodiment based on the positive individual list will be better understood by considering more specifically the case of the HDCP standards, used for high definition televisions with a digital input on a DVI or HDMI interface. According to the experts in cryptography S. Crosby et al. in their article <<A cryptanalysis of the High-bandwidth Digital Content Protection system>> presented at the ACM-CC58 DRM congress Workshop in 2001, the piracy of 40 HDCP apparatuses allows sufficient information to be obtained about the certification system to generate randomly pirate certificates that are completely valid from the system's point of view. The use of negative lists will be completely useless in this case. On the contrary, the use of positive lists in collaboration with authorised HDCP equipment manufacturers will limit the distribution of protected content exclusively to these apparatuses, thanks to the knowledge of the certificates effectively used by the manufacturers, unlike certificates generated randomly through piracy.

The identifier of a target device can either be its serial number or its manufacturing batch number, or its software or material version, or a certificate identifier. For the following description, the latter is taken as an example without excluding other variants.

The verification indication can also comprise other information such as the list to be used for verification when there are several lists.

Target device is understood to mean all types of visualization device, fixed or mobile, a computer, a recorder with or without hard disk, a recorder or a network server. The latter can serve as bridge between different target devices.

BRIEF DESCRIPTION OF THE DRAWINGS

The invention will be better understood thanks to the following detailed description that refers to the enclosed drawings that are given as a non-limitative example, namely:

FIG. 1 shows the passage of the data from the management centre to a high definition television set

DETAILED DESCRIPTION

In a television broadcast system, data representing an audio/video content as well as metadata and signalling data are transmitted by a management centre CG to a plurality of multimedia television broadcast receiver units STB. The audio and video stream is transmitted to the core of an MPEG channel, called a programme, according to the signalling in a PMT table (Program Map Table) also transmitted by television broadcast. If the programme is encrypted, a confidential stream of control messages (ECM) containing the decryption keys is associated to the programme broadcast. The different channels, corresponding to different contents, and their metadata (such as title, creation year, genre, names of main actors, etc. . . . ) are themselves identified by a set of signalling tables specified partly by the MPEG standard and partly by regional DVB and ATSC standards, such as the SDT tables (Service Description Table) and EIT (Event Information Table) also broadcast with the data stream, but in an asynchronous way.

In the case of pay television, secure messages for management, control and updating (EMM), for example transmission keys that encipher the aforementioned ECM stream, are transmitted in the televised data stream, in parallel with the programmes but in an asynchronous way. In particular, these messages allow the establishment of communication channels individually secured with each receiver.

Furthermore, it is also possible to update the software applied on the receiver units by transmitting with the data stream by television broadcast the updating data necessary to the latter.

The STB user unit, also called a master device, receives the data stream and manages the access rights to this data. In order to visualize the data, this type of unit can dispose of several communication means such as an RGB or Peritel output. In this case, the signals take an analog form and are protected by different technologies such as Macrovision and CGMS-A (Copy Generation Management System-Analog). These technologies do not use any authentication or verification mechanisms as described.

Another means of communication is disclosed in FIG. 1 that represents wireless means such as Wifi. The Wifi IN interface allows the transmission of the conditional access data towards a DTV television, for example in digital form. This digital form proves very attractive to ill-intentioned individuals and for this reason the data exchanged in the air is encrypted. Other transmission forms with wires can be used such as IEEE1394, Ethernet, USB, DVI and HDMI.

In practice, data encryption rely on a key that is generated dynamically and allows the television set to decrypt this data for processing. If a personal computer that dialogues with the master device in order to store the data in plaintext, takes the place of the DTV television set, the encryption of the data to be transferred fails to provide any protection.

For this reason a verification step has been added, namely verification based on the conformity of the certificate stored in each target device. A mutual authentication can be carried out on the basis of the certificate identifier. A key is then generated which serves to encrypt the exchanged data.

According to the invention, the data constituting the verification tables(s) L1, L2 . . . Ln is placed in the data stream DT transmitted from the management centre to the master device. This data can be transmitted in different ways in order to produce the optimal compromise between bandwidth and data security, namely:

EMM messages: these messages are secure messages for the updating of rights or keys and can be intended for one unit, a group of units or all the units. They can thus contain elements of the verification list, in particular the positive list. This list can be contained in one or more EMM messages according to its size.

in association with updating software of the receiver by television broadcast, thus benefiting well known associated uploading security mechanisms, such as authentication of the updating and management of the version number by the receiver.

data stream: content transmitted during service standby: the periods without diffusion are used, for example between 4 a.m. and 6 a.m. in the morning, to replace the audio/video content with verification lists.

signalling table. These tables form part of the descriptive data of the content and can also contain the programme grid data. These tables can contain the verification list(s) such as described in this invention, for example in the case of the DVB standard in association with a given content by insertion in the EIT table containing the programmes for 8 days and transmitted on a specific channel, with a large bandwidth.

In the last two cases, it is necessary to provide mechanisms dedicated to protection of the verification lists, for example by means of specific keys known to the receivers.

Once received by the master device these lists are stored either in a silicon memory (flash) or on hard disk. They can be secured locally by a key pertaining to the user unit or the key of the certificate associated to this unit.

As indicated above, these tables can define either the devices capable of processing the conditional access data (positive list) or on the contrary those prohibited from said processing (negative list). These lists can enumerate each identifier concerned or can define the identifier areas. Therefore, if an apparatus is pirated and its identifier reproduced in numerous clones, identified by the anti-piracy control, it is necessary to exclude it from the authorized target devices.

An important point in this invention is the flexibility brought by the verification indication. This indication is directly associated to the content and allows, with a minimal cost in terms of bandwidth, a decision to be made during diffusion as to whether a verification must be carried out with reference to one or several previously transmitted verification lists and allows the control of the corresponding version number. These verification indications can be transmitted in several ways in order to render them dissociated from a content at the time of its television broadcast, for example:
  in a control message ECM, when the content is encrypted (pay television broadcast applications). These messages present the advantage of being secured.
  directly in the description data of the content, such as the programme map table PMT (Program Map Table) that describes the organization of the audio and video stream associated to the content.
  in the description tables of the content regularly transmitted with the latter, such as the EITp/f tables comprising information about the current content and the following contents on a television broadcast channel.

In the last two cases, it is necessary to provide dedicated security mechanisms of the verification lists, for example by means of dedicated keys known to the receivers.

If several tables are loaded into the master device, the verification indication will specify which table is to be used for verification. Thus a content with a low value could specify a different verification table than a high value content. This is applied in particular in the case of a mixed receiver that processes free programmes as well as pay television broadcast programmes.

Furthermore, the verification indication also allows the identification of the version number of the list transmitted most recently, in order to avoid the possible filtering by the receiver of the new, more restrictive verification lists.

This verification indication can define a security level. In a previous step, the master device receives a security list with a definition of list(s) to be used for each level. For example, a security level 3 means that for the HDCP protocol, the list HD 12, version 2.23 is specified and for the DTCP protocol, the list DT 8, version 1.17 is specified. For only one security level, the set of protocols as well as the desired version is sent. This intermediate list is preferably secured.

According to one embodiment it is possible to transmit a particular list for a particular master device. This can be achieved in a point-to-point way or in diffusion mode with addressing of the related master device. This list takes into account the material environment, for example, of the interface type with target devices. It is not useful to store the identifiers pertaining to an interface type (for example HDCP for HDMI) when the only interface provided on this device is of the USB type.

According to a different embodiment, the positive list can be limited solely to targets devices previously registered from a management centre, corresponding to target devices effectively connected to a particular master device.

In the latter case, an initialization process allows the user to transmit the set of identifiers of his/her target devices. This process can be carried out in an automated way thanks to the feedback channel of the master device and the identifiers, whether they are the serial numbers or the identifier of the certificate, are transmitted to the management centre. A description of the technical capacity of the target devices can complete this data (television set, computer, PVR with or without recorder, etc.). The transmission of this information can also be made via the telephone (vocal server) or the sending of a short message.

This initialization process can advantageously use a Web (Internet) service for the registration of the user's data.

The management centre having a black list (or negative) will verify if the identifiers received by a user are comprised in this exclusion list and excludes these identifiers from the positive list transmitted to the master device. This verification can be made on the basis of a positive list that lists all the valid certificates.

It is possible that the management centre will not able to use a reliable black (or negative) list, for example in the case of piracy on a large scale of the HDCP regulation. In this case, the identifiers received by a user must be controlled by an external control centre disposing of a list of valid identifiers. This control centre can pertain to the manufacturer, when the identifier transmitted by the user identifies the manufacturer of the equipment, or directly corresponds to the official certification authority such as one of the associations DTLA for DTCP, SVPLA for SVP, or LLC for HDCP, responsible for the distribution of valid certificates to all the manufacturers implementing the standards controlled by said associations.

Furthermore, it is possible that the management centre does not know the exact data, such as the certificate, of a device target of a user. On the basis of the transmission of a material identifier, which could be the serial number of the device or any other indication allowing the identification of this device, the management centre then questions a control centre to obtain the certificate identifiers. This control centre can pertain to a manufacturer or group together several manufacturers, for example it can be the official certification authority such as one of the associations DTLA for DTCP, SVPLA for SVP, or LLC for HDCP.

The certificate of a device is generally directly connected to the communication layer. Therefore, if a device contains several communication means such as USB and HDMI, it generally disposes of several certificates corresponding to different standards such as DTCP and HDCP. The verification can be executed on the active communication means for the transmission of the master device data to the target device or on all the certificates.

In the case of a content that would be stored in the master device before its transfer towards the target device, the verification information is also stored in order to be able to be executed at the time of the subsequent transmission of the content.

According to one embodiment of the invention, the verification in the positive and/or negative lists is carried out previously on the master device. The master device itself will verify the conformity of certificate(s) of its communication means.

It is possible to verify an identification number that has no relation with the communication means, for example its serial number.

According to the chosen operation method, when one means of communication is revoked, the master device is considered as revoked.

In the case of a home network, the master device can be connected to a first target device such as a storage unit. Verification is carried out by the master device in order to authorize the target device to transfer the data. Parallel to the transfer of the data, the verification lists are also transmitted. The verification indication that is associated to the content can thus be carried out by this device that then becomes a master device. The process of the invention is thus noted on all the elements of a home network.

This invention also covers a master device disposing of reception means for content(s) and reception means of the verification list(s) such as that described above. This device comprises verification means in conformity with a target device and storage means called lists. This device includes means for extracting a verification indication associated to the content and for carrying out a verification cycle of the target device on the basis of the verification indication and of the verification list(s) previously stored.

What is claimed is:

1. A verification method of a target device connected to a master device, the master device having means to receive a content transmitted by a broadcast centre via a data stream, the master device and the target device authenticating themselves by means of an exchange of a certificate including at least one certificate identifier, the verification method comprising:
    requesting to the broadcast centre, by the master device, at least one certificate identifier list for the master device, the request including an identification of the master device;
    determining an interface of the said master device by the broadcast centre,
    preparing the certificate identifier list according to the interface;
    transmitting to the master device updated rights and keys as well as the at least one certificate identifier list pertaining to the master device, in one or more EMM messages;
    storing the at least one certificate identifier list on the master device; and
    extracting a verification indication associated with the content transmitted by the broadcast centre, the verification indication including activation or deactivation of a verification of the target device, wherein
        when the verification indication includes the activation of the verification of the target device, the verification method further includes verifying a certificate of the target device by the master device and using the stored at least one certificate identifier list to authorize or prohibit an exchange of data with said target device.

2. The verification method according to claim 1, wherein the at least one certificate identifier list is called positive and includes certificate identifiers authorized to exchange data between the master device and the target device.

3. The verification method according to claim 1, wherein the at least one certificate identifier list is called negative and includes certificate identifiers prohibited from the exchange of data between the master device and the target device.

4. The verification method according to claim 1, wherein the verification indication is contained in a content description data.

5. The verification method according to claim 4, wherein the content description data is transmitted in a programme map table (PMT).

6. The verification method according to claim 4, wherein the content description data is transmitted as an EITp/f table, the EITp/f table including information about a current content and a subsequent content.

7. The verification method according to claim 1, wherein the verification indication is contained in a control message (ECM) containing a deciphering key of said content.

8. The verification method according to claim 1, wherein the data stream comprises a plurality of verification lists and in that the verification indication associated to said content indicates the verification list to be used.

9. The verification method according to claim 2, wherein the list called positive is unique to the master device.

10. The verification method according to claim 9, wherein the list called positive is unique to the master device and comprises a set of target devices identified by the broadcast centre as forming part of a home network connected to said master device.

11. The verification method according to claim 10, wherein the identifiers in the positive list unique to the master device are verified by the broadcast centre prior to broadcast in order to exclude the identifiers signaled by a global negative list known to the master device.

12. The verification method according to claim 10, wherein the certificate identifier of the target device is carried out by:
    transmitting, to a management centre, a material identifier of the target device, the material identifier pertaining to a manufacturer of said target device,
    transmitting, by the management centre, the material identifier to a control centre of the target device,
    transmitting, by the control centre, the certificate identifier to the management centre associated to said material identifier,
    forming, the positive list including said identifier certificate by the management centre, and
    transmitting the positive list to the master device.

13. The verification method according to claim 12, wherein the material identifier is transmitted to the broadcast centre by the owner of the master device by means of the feedback channel of the master device.

14. The verification method according to claim 12, wherein the certificate identifier is transmitted to the broadcast centre by the owner of the master device by telephone or a short message (SMS).

15. The verification method according to claim 9, wherein the list called positive unique to the master device is transmitted to the master device by means of one or several personal messages (EMM) in the data stream.

16. The verification method according to claim 9, wherein the list called positive unique to the master device is transmitted to the master device by unidirectional communication means.

17. The verification method according to claim 1, wherein the target device is a visualization device, a computer, a storage unit or a network server.

18. The verification method according to claim 1, wherein transmitting of the certificate identifier list is made by broadcast, the list being addressed to said master device.

19. The verification method according to claim 1, wherein transmitting of the certificate identifier list is made through a point-to-point connection.

* * * * *